United States Patent
Lee

(10) Patent No.: US 11,823,577 B2
(45) Date of Patent: Nov. 21, 2023

(54) APPARATUS FOR CONTROLLING PLATOONING AND METHOD FOR PLANNING PATH THEREOF

(71) Applicants: HYUNDAI MOTOR COMPANY, Seoul (KR); KIA CORPORATION, Seoul (KR)

(72) Inventor: Chanhwa Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 191 days.

(21) Appl. No.: 17/464,143

(22) Filed: Sep. 1, 2021

(65) Prior Publication Data

US 2022/0292981 A1  Sep. 15, 2022

(30) Foreign Application Priority Data

Mar. 15, 2021 (KR) .................. 10-2021-0033510

(51) Int. Cl.
*G08G 1/00* (2006.01)
*B60W 30/12* (2020.01)
(Continued)

(52) U.S. Cl.
CPC ............... *G08G 1/22* (2013.01); *B60W 30/12* (2013.01); *B60W 30/165* (2013.01);
(Continued)

(58) Field of Classification Search
CPC ......... G08G 1/22; H04W 4/46; G06V 20/588; B60W 30/12; B60W 30/165;
(Continued)

(56) References Cited

U.S. PATENT DOCUMENTS

| 7,158,075 B2* | 1/2007 | Nakamura | G01S 17/931 342/70 |
| 2018/0113477 A1* | 4/2018 | Rodriguez | G05D 1/0061 |
| 2019/0052436 A1* | 2/2019 | Desai | H04L 5/0055 |
| 2020/0078572 A1* | 3/2020 | Kreutzmann | B05B 11/0027 |

(Continued)

FOREIGN PATENT DOCUMENTS

| JP | H05205041 A | * | 8/1993 |
| KR | 10-2021-0075675 A | | 6/2021 |

*Primary Examiner* — Behrang Badii
*Assistant Examiner* — Jay Khandpur
(74) *Attorney, Agent, or Firm* — MORGAN, LEWIS & BOCKIUS LLP

(57) ABSTRACT

An apparatus for controlling platooning includes a recognizing device to recognize front information of a vehicle by using at least one sensor, a communication device to support vehicle to vehicle communication, and a processor connected with the recognizing device and the communication device. The processor acquires information on a first line in front of the vehicle, through the recognizing device, receives information on a second line, which is transmitted from a preceding vehicle, through the communication device, generates information on a third line by using the information on the first line and the information on the second line, based on information on the preceding vehicle, generates information on a final line by using the information on the first line, the information on the second line, and the information on the third line, and plans a path for the platooning by utilizing the information on the final line.

14 Claims, 11 Drawing Sheets

(51) Int. Cl.
   *B60W 30/165* (2020.01)
   *B60W 40/072* (2012.01)
   *G05D 1/02* (2020.01)
   *H04W 4/46* (2018.01)
   *G06V 20/56* (2022.01)

(52) U.S. Cl.
   CPC ......... *B60W 40/072* (2013.01); *G05D 1/0293* (2013.01); *G05D 1/0295* (2013.01); *G06V 20/588* (2022.01); *H04W 4/46* (2018.02); *B60W 2300/145* (2013.01); *B60W 2552/30* (2020.02); *B60W 2552/53* (2020.02); *B60W 2556/65* (2020.02)

(58) Field of Classification Search
   CPC ........... B60W 40/072; B60W 2555/53; B60W 2552/30; B60W 2556/65; B60W 2300/145; G05D 1/0293; G05D 1/0295
   See application file for complete search history.

(56) References Cited

U.S. PATENT DOCUMENTS

| | | | |
|---|---|---|---|
| 2020/0105224 A1* | 4/2020 | Higashiyama | G02B 27/0101 |
| 2020/0255005 A1* | 8/2020 | Matsunaga | B60R 11/04 |
| 2020/0291732 A1* | 9/2020 | Ooi | B01D 33/41 |
| 2021/0109545 A1* | 4/2021 | Lopez | G05D 1/0088 |
| 2021/0181763 A1 | 6/2021 | Lee | |
| 2021/0380140 A1* | 12/2021 | McGill | G05D 1/0088 |
| 2021/0387495 A1* | 12/2021 | Tebbe | B60G 17/0152 |
| 2022/0063622 A1* | 3/2022 | Jumpertz | G08G 1/22 |
| 2022/0196395 A1* | 6/2022 | Maehnert | G01B 11/26 |

* cited by examiner

APPARATUS FOR CONTROLLING PLATOONING AND METHOD FOR PLANNING PATH THEREOF

CROSS-REFERENCE TO RELATED APPLICATION

This application claims priority to and the benefit of Korean Patent Application No. 10-2021-0033510, filed on Mar. 15, 2021, the entire contents of which are incorporated herein by reference.

TECHNICAL FIELD

The present disclosure relates to an apparatus for controlling platooning and a method for planning a path thereof.

BACKGROUND

The statements in this section merely provide background information related to the present disclosure and may not constitute prior art.

Platooning refers to that one leading vehicle (LV) and at least one following vehicle (FV) travel while forming a platoon (group). In platooning, the following vehicle travels while maintaining a specific distance to a preceding vehicle, through a sensing technology including a radar and a camera. The platooning has an advantage in reducing fuel by minimizing air resistance due to a traveling characteristic that the following vehicle follows the leading vehicle.

A vehicle performing the platooning recognizes a line in front of the vehicle by using the camera and follows the line by using the recognized information of the line. However, in platooning, a line actually to be recognized by the vehicle is significantly short, since the distance to the preceding vehicle is short, and the line is hidden by a trailer of the preceding vehicle. Accordingly, the vehicle may not precisely recognize the information of the line. To solve the problem, conventionally, the preceding vehicle transmits, to the vehicle, information on a line previously recognized, thereby complementing the information on the line, which may not be acquired due to the short distance between vehicles in platooning. The movement of the vehicle should be calculated at time points at which a subject vehicle and the preceding vehicle pass the same point, and the calculated movement should be corrected by using a characteristic surrounding environment object. In this procedure, an error may be made due to a timing difference between the time points. In addition, errors may be accumulated in a rear portion of a string in which several vehicles simultaneously travel.

SUMMARY

An aspect of the present disclosure provides an apparatus for controlling platooning and a method for planning a path thereof, capable of estimating information on a line by utilizing real-time information of a preceding vehicle and planning a path for platooning using the estimated information on the line, even if the distance between vehicles is significantly short in platooning.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling platooning may include a recognizing device to recognize front information of a vehicle by using at least one sensor, a communication device to support vehicle to vehicle (V2V) communication, and a processor connected with the recognizing device and the communication device. The processor may acquire information on a first line in front of the vehicle by using the recognizing device, receive information on a second line that is transmitted from a preceding vehicle through the communication device, generate information on a third line by using the information on the first line and the information on the second line, based on information on the preceding vehicle, generate information on a final line by using the information on the first line, the information on the second line, and the information on the third line, and plan a path for the platooning by utilizing the information on the final line.

The information on the preceding vehicle may include a distance between the vehicle and the preceding vehicle, a position of the center of a rear surface of the preceding vehicle, an angle of the rear surface of the preceding vehicle acquired by the recognizing device, a tractor length, a trailer length, and a refraction angle between a tractor and a trailer that is transmitted from the preceding vehicle.

The processor may coordinate-transform the information on the second line, based on a vehicle coordinate system by using the information on the preceding vehicle.

The processor may generate the information on the third line by approximating to a straight line or a curved line to link an end point of the information on the first line to a starting point of the information on the second line.

The processor may generate the information on the final line by integrating the information on the first line, the information on the second line, and the information on the third line based on the vehicle coordinate system.

The apparatus may further include a vehicle controller to control a lateral behavior of the vehicle to follow a line based on the path for the platooning.

The recognizing device may further comprise at least one of a front camera, an AVM camera, a front radar, or a refraction angle sensor.

The processor may transmit, to a following vehicle, the information on the first line, a refraction angle of the vehicle, and specification information of the vehicle through the communication device.

In another form of the present disclosure, a method for planning a path of an apparatus for controlling platooning comprising acquiring information on a first line in front of a vehicle by at least one sensor mounted in the vehicle, receiving information on a second line transmitted from a preceding vehicle through vehicle to vehicle (V2V) communication, generating information on a third line by using the information on the first line and the information on the second line, based on information on the preceding vehicle, generating information on a final line by using the information on the first line, the information on the second line, and the information on the third line, and planning a path for the platooning by utilizing the information on the final line.

The acquiring of the information on the first line may further include acquiring, by using at least one sensor, the information on the preceding vehicle that includes a distance between the vehicle and the preceding vehicle, a position of the center of a rear surface of the preceding vehicle, and an angle of the rear surface of the preceding vehicle, by using the at least one sensor.

The receiving of the information on the second line may include receiving, from the preceding vehicle, a tractor length, a trailer length, and a refraction angle between a tractor and a trailer.

The generating of the information on the third line may include coordinate-transforming the information on the second line, based on a vehicle coordinate system by using the information on the preceding vehicle, and generating the information on the third line by approximating to a straight line or a curved line which is formed by linking an end point of the information on the first line to a starting point of the information on the second line.

The generating of the information on the final line may include generating the information on the final line by integrating the information on the first line, the information on the second line, and the information on the third line based on the vehicle coordinate system.

The method further includes laterally controlling, by a vehicle controller, the vehicle to follow a line, which is based on the path for the platooning.

The method further includes further comprising transmitting, to a following vehicle, the information on the first line, a refraction angle of the vehicle, and specification information of the vehicle through the V2V communication.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
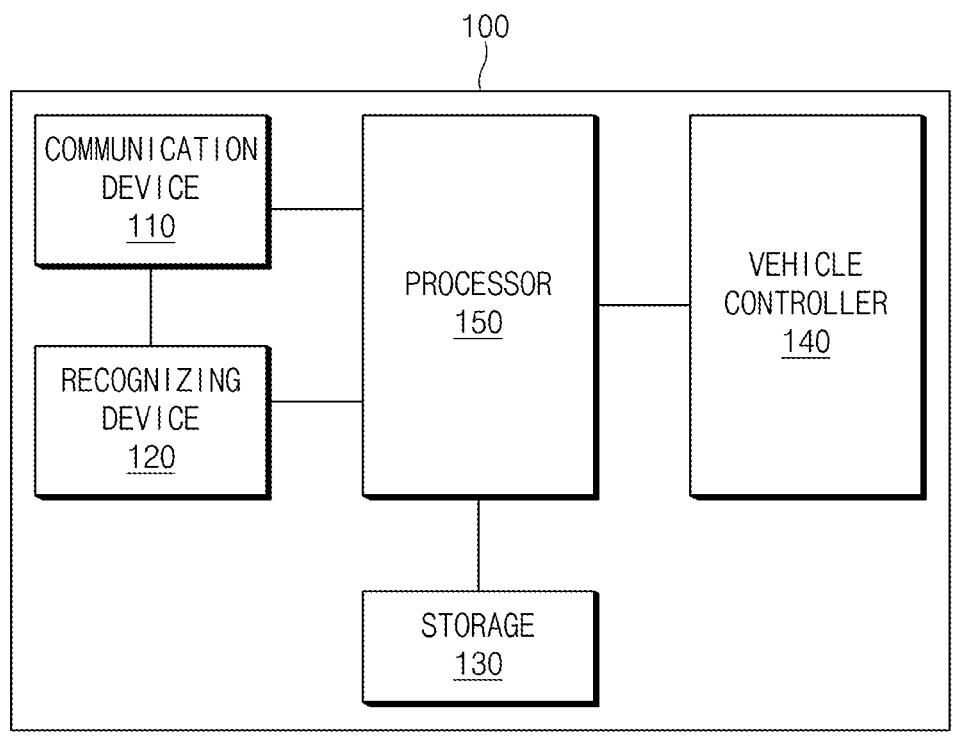
FIG. 1 illustrates a block diagram of an apparatus for controlling platooning, in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In this specification, the front-most vehicle of a string of vehicles platooning is referred as a "leading vehicle", a vehicle following the leading vehicle is referred as a "following vehicle (FV)", a vehicle positioned in front of the vehicle is referred as a "forward vehicle", a vehicle positioning right before the vehicle is referred as a "preceding vehicle", and the leading vehicle and the following vehicle are collectively referred to as "platooning vehicles". In the coordinate system, the center of a front end (front surface) or rear end (rear surface) of a vehicle is defined as an "origin point", the longitudinal direction of the vehicle is defined as an "X axis", and the width direction of the vehicle is defined as a "Y axis". A line refers to a line to link central points of lanes.

Figure 2:
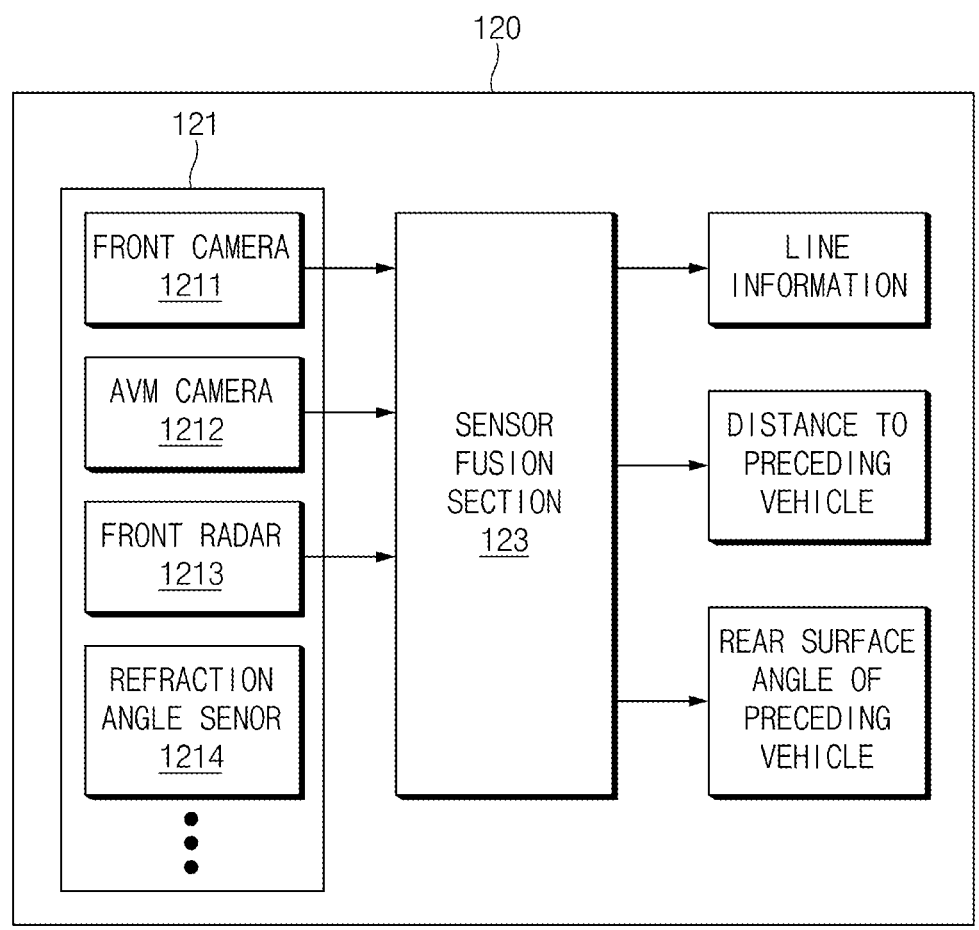
FIG. 2 is a block diagram illustrating a recognizing device of FIG. 1.

FIG. 1 illustrates a block diagram of an apparatus for controlling platooning, in some forms of the present disclosure, and FIG. 2 is a block diagram illustrating a recognizing device of FIG. 1.

An apparatus (platooning control apparatus) 100 for controlling platooning may be mounted in a vehicle, which is able to perform self-driving, to plan a path and to control a behavior of the vehicles such that the vehicle travels along the planned path. The apparatus 100 for controlling platooning may include a communication device 110, a recognizing device 120, a storage 130, a vehicle controller 140, and a processor 150, as illustrated in FIG. 1.

The communication device 110 may support communication with another vehicle in a platoon through vehicle to vehicle (727) communication. The communication device 110 may receive information (data) transmitted from a forward vehicle (FVn−1) through the V2V communication.

In addition, the communication device 110 may transmit information on the following vehicle through V2V communication. In addition, the communication device 110 may support communication with electronic control devices in a vehicle through an in-vehicle network (IVN). The IVN may include a controller area network (CAN), FlexRay, Media Oriented Systems Transport (MOST), Local Interconnect Network (LIN), and/or an Ethernet. The communication device 110 may include a communication processor, a communication circuit, an antenna, and/or a transceiver.

The recognizing device 120 may recognize information (line information) on a line in front, information on a preceding vehicle, and/or information on a surrounding environment by using the at least one sensor. Referring to FIG. 2, the recognizing device 120 may include a sensing section 121 and a sensor fusion section 123. The sensing section 121 acquires front data (front information) through a front camera 1211, an Around View Monitoring (AVM) camera 1212, a front radar 1213, and/or a refraction angle sensor 1214. The sensor fusion section 123 may output information (line information) on a line in front of the vehicle, information on a status of the preceding vehicle, and/or a refraction angle of the vehicle by fusing the front data acquired through the sensing section 121. The line information may include the curvature of the line, a curvature rate of the line, a heading angle, an offset and/or an effective line length. In this case, the heading angle refers to a rotational angle (an angle formed between an X axis and the line) of the line based on the X axis of a vehicle coordinate system, and the offset refers to a distance between the center of the vehicle in the Y axis direction and the center (that is, the center between lines) of a lane on which the vehicle is driving. The information on the status of the preceding vehicle may include the distance between the vehicle and the preceding vehicle and/or information on a rear surface angle of the preceding vehicle.

In other words, the recognizing device 120 may recognize the information on the line in front of the vehicle by using the front camera 1211 and/or the AVM camera 1212. The recognizing device 120 may measure the distance between the vehicle and the preceding vehicle by using the front radar 1213. The recognizing device 120 may measure an angle (that is, the rear surface angle of the preceding vehicle) formed between the front surface of the vehicle and the rear surface of the preceding vehicle by using the front camera 1211. The recognizing device 120 may measure an angle (that is, the refraction angle of the vehicle) formed between the tractor and the trailer by using the refraction angle sensor 1214. Although some forms of the present disclosure are described in terms that the refraction angle of the vehicle is measured by using the refraction angle sensor 1214, the present disclosure is not limited thereto. For example, the refraction angle may be estimated (calculated) by utilizing another type of sensor. The recognizing device 120 may include at least one processor (not illustrated) and a memory (not illustrated). The memory (not illustrated) may be a non-transitory storage medium to store instructions executed by a processor.

The storage 130 may store a program for the operation of the processor 150, and may store input data and/or output data of the processor 150. The storage 130 may store a line recognizing algorithm, a path planning algorithm, a following driving control algorithm, and/or an autonomous driving control algorithm. The storage 130 may store map information, vehicle specification information, and/or various setting information. The storage 130 may be implemented with at least one of storage media (recording media) such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, and/or a buffer The vehicle controller 140 may receive information on a path for platooning from the processor 150. The vehicle controller 140 may laterally control the vehicle to follow the line, based on the received information on the path. The vehicle controller 140 may control a lateral behavior of the vehicle by controlling a steering device, a power device, and/or a braking device.

The processor 150 may control the overall operation of the apparatus 100 for controlling platooning. The processor 150 may include at least one of an Application Specific Integrated Circuit (ASIC), a Digital Signal Processor (DSP), Programmable Logic Devices (PLD), Field Programmable Gate Arrays (FPGAs), a Central Processing unit (CPU), microcontrollers, and/or microprocessors.

The processor 150 may acquire information (first line information) on the line in front of the vehicle and the information on the status of the preceding vehicle by using the recognizing device 120. In addition, the processor 150 may receive vehicle specification information, information on a status of the vehicle and/or line information (second line information), which is transmitted from the preceding vehicle, through the communication device 110. The vehicle specification information may include a vehicle length, a tractor length and/or a trailer length. The information on the status of the vehicle may include the refraction angle of the vehicle.

The processor 150 may generate the total line information in real time by integrating the information, which is received from the preceding vehicle, with the first lane information. The processor 150 may coordinate-transform the second line information by using the information on the specification of the preceding vehicle and the information on the status of the preceding vehicle. The processor 150 may generate third line information by approximating a line (third line), which is hidden by the preceding vehicle, to a straight line or a curved line, based on the first line information and the second line information coordinate-transformed and by reconfiguring the line. The processor 150 may generate the information (final line information) on a final line based on the vehicle coordinate system, by using the first line information, the second line information coordinate-transformed, and the third line information.

The processor 150 may generate a path for platooning, based on the final line information. The processor 150 may transmit the planned path for platooning to the vehicle controller 140.

The processor 150 may transmit, to the following vehicle, the vehicle specification information, which is stored in the storage 130, and the line information and the refraction angle of the vehicle, which are acquired by using the recognizing device 120, through the communication device 110.

Figure 3:
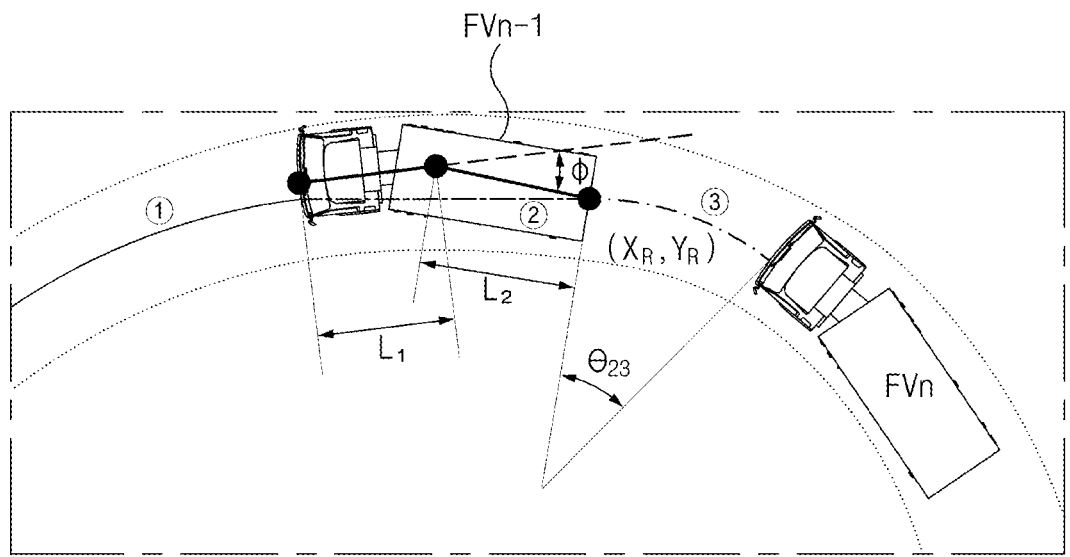
FIG. 3 is a view illustrating an operation of an apparatus for controlling platooning, in one form of the present disclosure.

FIG. 3 is a view illustrating an operation of an apparatus for controlling platooning, in some forms of the present disclosure. In some forms of the present disclosure, for the convenience of explanation, the preceding vehicle "FVn−1" of the vehicle "FVn" is employed as a leading vehicle of a string.

The processor 150 of the apparatus 100 for controlling the platooning, which is mounted in the vehicle "FVn" may acquire the information (that is, first line information) on a first line ③ based on the vehicle coordinate system by using the recognizing device 120. The processor 150 may acquire information on the position $(X_R, Y_R)$ of the rear surface of the trailer of the preceding vehicle "FVn−1" and information on the rear surface angle $\theta_{23}$ of the trailer, by utilizing the recognizing device 120.

The processor 150 may receive, through the communication device 110, the specification information of the preceding vehicle "FVn−1" and the status information of the preceding vehicle "FVn−1", which are transmitted from the preceding vehicle "FVn−1". In other words, the processor 150 may receive information on a tractor length "$L_1$", a trailer length "$L_2$", and the refraction angle "Φ" between the tractor and the trailer.

In addition, the processor 150 may receive, through the communication device 110, information (that is, second line information) on the second line ①, which is transmitted from the preceding vehicle "FVn−1". The second line information is line information recognized by sensors mounted in the preceding vehicle "FVn−1".

The processor 150 may transform the second line information based on the vehicle coordinate system by utilizing information on the lengths "L1" and "L2", the refraction angle, the position $(X_R, Y_R)$ of the rear surface, and the rear surface angle "$\theta_{23}$" of the preceding vehicle "FVn−1". The processor 150 may generate the information on a third line by approximating, to a straight line or a curved line, the third line ② which is formed by linking an end point of the first line to a starting point of the second line.

The processor 150 may calculate information on a final line by integrating the first line information, the second line information, and the third line information, based on the vehicle coordinate system.

Figure 4:
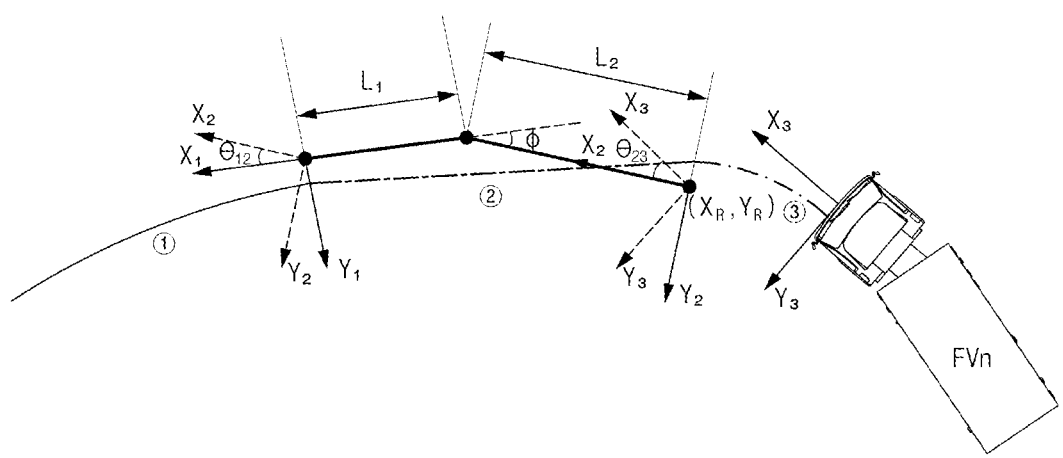
FIG. 4 is a view illustrating a method for acquiring information for following a line, in one form of the present disclosure.

FIG. 4 is a view illustrating a method for acquiring information for following a line, in some forms of the present disclosure.

The vehicle "FVn" may acquire the information on the first line ③ (that is, the first line information) by utilizing the front camera 1211. The first line information may include the offset, the heading angle, the curvature, the curvature rate, and the effective line length of the first line ③ based on the vehicle coordinate system $(X_3, Y_3)$.

The vehicle "FVn" may acquire the position $(X_R, Y_R)$ of the rear surface of the preceding vehicle by using the front camera 1211 and the front radar 1213. The position $(X_R, Y_R)$ of the rear surface of the preceding vehicle is an origin point of a rear end coordinate system $(X_2, Y_2)$ of the preceding vehicle based on the vehicle coordinate system.

The vehicle "FVn" may estimate the posture of the trailer through vision and/or image processing by utilizing the front camera 1211 and/or Light Detection and Ranging (LiDAR). In other words, the vehicle "FVn" may acquire a rear surface angle of the preceding vehicle, that is, the trailer. The rear surface angle of the preceding vehicle is an angle formed between a $Y_2$-coordinate-axis and a $Y_3$-coordinate-axis.

The vehicle "FVn" may receive vehicle specification information from the preceding vehicle "FVn−1" through V2V communication. The vehicle specification information may include the tractor length "$L_1$" and the trailer length "$L_2$" of the preceding vehicle.

The vehicle "FVn" may receive the refraction angle Φ of the preceding vehicle "FVn−1", which is transmitted from the preceding vehicle "FVn−1" through the V2V communication. The preceding vehicle "FVn−1" may directly measure the refraction angle of the preceding vehicle "FVn−1" through the refraction angle sensor, or may estimate the refraction angle Φ by utilizing a rear camera or a rear radar. The refraction angle Φ of the preceding vehicle "FVn−1" is equal to an angle $\theta_{12}$ formed between an X1-coordinate-axis and an X2-coordinate axis.

The vehicle "FVn" may calculate the position of a front end of the preceding vehicle "FVn−1", that is, the tractor. The position of the front end of the preceding vehicle "FVn−1" is an origin point of a front coordinate system $(X_1, Y_1)$ of the preceding vehicle "FVn−1" based on a rear coordinate system $(X_2, Y_2)$ of the preceding vehicle "FVn−1". The vehicle "FVn" may calculate the tractor length "L1", the trailer length "$L_2$", and the refraction angle Φ, which are received from the preceding vehicle "FVn−1".

The vehicle "FVn" may receive second line information from the preceding vehicle "FVn−1" through the V2V communication. The preceding vehicle "FVn−1" may acquire the information on the line (that is, the second line information) in front of the preceding vehicle "FVn−1" by using a sensor (e.g., a front camera), and may transmit the acquired second line information to the vehicle "FVn". The second line information may include the offset, the heading angle, the curvature, the curvature rate, and the effective line length of the second line ① based on the front coordinate system $(X_1, Y_1)$ of the preceding vehicle "FVn−1".

The vehicle "FVn" may calculate the information on the third line ② of a straight line or a curved line to link a starting point of the second line ① with an end point of the first line ③. The vehicle "FVn" may calculate the starting point of the second line ① by coordinate-transforming, based on the vehicle coordinate system $(X_3, Y_3)$, the second line ① based on the front coordinate system $(X_1, Y_1)$ of the preceding vehicle "FVn−1". The vehicle "FVn" may calculate the end point of the first line ③ from the first line information, based on the vehicle coordinate system $(X_3, Y_3)$.

The vehicle "FVn" may acquire the third line information by calculating a polynomial that approximates to a straight line passing through the starting point of the second line ① and the end point of the first line ③. The vehicle "FVn" may generate final line information by integrating the first line information, the second line information, and the third line information, based on the vehicle coordinate systems $(X_3, Y_3)$. The vehicle "FVn" may calculate the offset, the heading angle, the curvature, and the curvature rate of the final line by approximating to a third-order polynomial.

Figure 5:
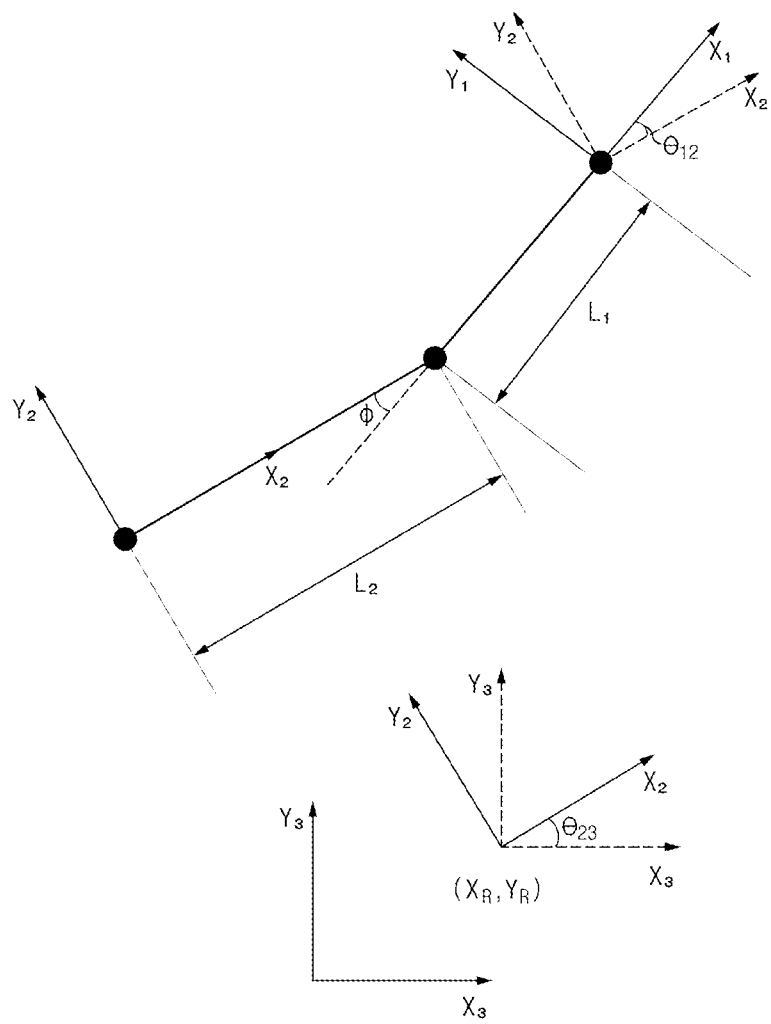
FIG. 5 is a view illustrating the relationship between vehicle coordinate systems, in one form of the present disclosure.

FIG. 5 is a view illustrating the relationship between vehicle coordinate systems, in some forms of the present disclosure.

Referring to FIG. 5, an origin point of the front coordinate system $(X_1, Y_1)$ of the preceding vehicle "FVn−1" may be translated based on the rear coordinate system $(X_2, Y_2)$ of the preceding vehicle "FVn−1" and transformed to a position $(L_2+L_1 \cos \phi, L_1 \sin \phi)$ based on the coordinate system $(X_2, Y_2)$. The coordinate system $(X_1, Y_1)$ translated is rotated and transformed by Φ $(=\theta_{12})$ such that the coordinate system $(X_1, Y_1)$ is matched with the coordinate system $(X_2, Y_2)$. In this case, Φ is an angle formed between an $X_1$ axis and an $X_2$ axis.

Figure 6:
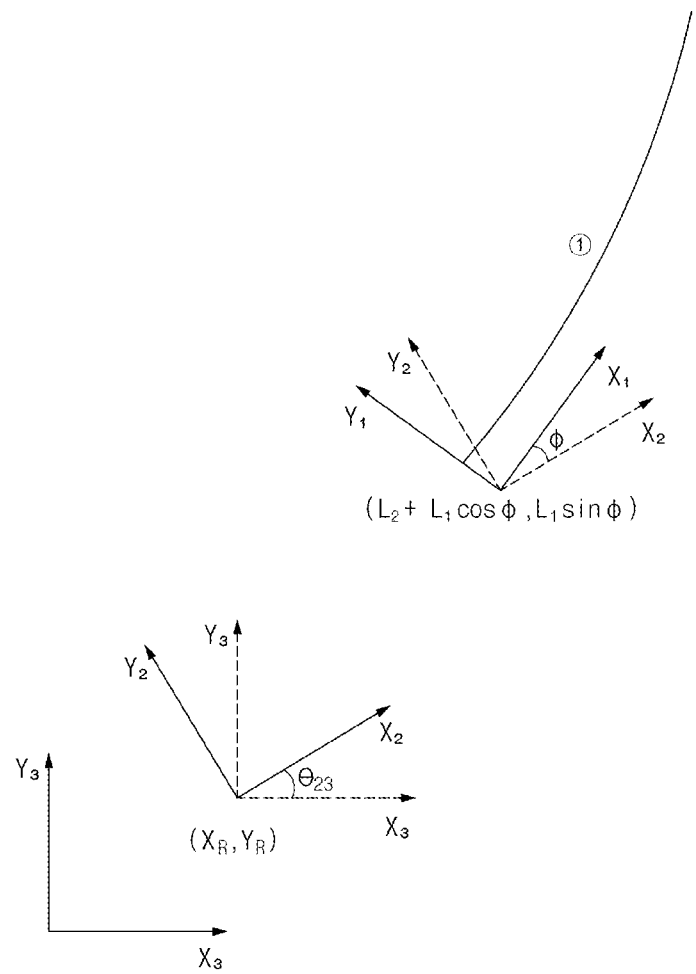
FIG. 6 is a view illustrating coordinate-transformation of information on a second line, in one form of the present disclosure.

The origin point of the coordinate system $(X_2, Y_2)$ may be translated based on the coordinate system $(X_3, Y_3)$, and transformed into a position $(X_R, Y_R)$ based on the coordinate system $(X_3, Y_3)$. The translated coordinate system $(X_2, Y_2)$ may be rotated and transformed by $\theta_{23}$ such that the coordinate system $(X_2, Y_2)$ is matched with the coordinate system $(X_3, Y_3)$. The angle $\theta_{23}$ is the angle between the $X_2$ axis and the $X_3$ axis FIG. 6 is a view illustrating coordinate-transformation of information on a second line, in some forms of the present disclosure.

The processor 150 may coordinate-transform the information (that is, second line information) on the second line ①, which is based on the coordinate system $(X_1, Y_1)$, into information based on the coordinate system $(X_2, Y_2)$. The second line ① based on the coordinate system $(X_1, Y_1)$ may be expressed as in Equation 1.

$$y_1 = \alpha_{13}x_1^3 + \alpha_{12}x_1^2 + \alpha_{11}x_1 + \alpha_{10} \qquad \text{Equation 1}$$

When the effective line length is $l_1$, points $(x_{o1,1}, y_{o1,1}), \ldots, (x_{o1,n}, y_{o1,n}), \ldots,$ and $(x_{o1,N}, y_{o1,N})$ on the effective line may be extracted. In this case, $0 = x_{o1,1} \leq \ldots \leq x_{o1,n} \leq \ldots \leq x_{o1,N} = l_1$ is satisfied.

The processor 150 may transform points on the effective line of the second line ①, into points based on the coordinate system $(X_2, Y_2)$. First, the processor 150 may rotate and transform the second line ① into a line based on the coordinate system $(X_2, Y_2)$. The processor 150 may rotate and transform the second line ① through Equation 2.

$$\begin{bmatrix} x_{r1,n} \\ y_{r1,n} \end{bmatrix} = \begin{bmatrix} \cos\phi & -\sin\phi \\ \sin\phi & \cos\phi \end{bmatrix} \begin{bmatrix} x_{o1,n} \\ y_{o1,n} \end{bmatrix} \qquad \text{Equation 2}$$

Next, the processor 150 may translate the rotated and transformed second line ① to a line based on the coordinate system $(X_2, Y_2)$. The processor 150 may translate the second line O rotated and transformed through [Equation 3] and [Equation 4].

$$x_{t1,n} = x_{r1,n} + L_2 + L_1 \cos\phi \qquad \text{Equatioin 3}$$

$$y_{t1,n} = y_{r1,n} + L_1 \sin\phi \qquad \text{Equation 4}$$

The processor 150 may generate second line information $(x_{t1,1}, y_{t1,1}), \ldots, (x_{t1,n}, y_{t1,n}), \ldots,$ and $(x_{t1,N}, y_{t1,N})$ coordinate-transformed based on the coordinate system $(X_2, Y_2)$.

In addition, the processor 150 may rotate and transform the second line information, which is coordinate-transformed based on the coordinate system $(X_2, Y_2)$ through Equation 5, to a line based on the coordinate system $(X_3, Y_3)$.

$$\begin{bmatrix} x_{p1,n} \\ y_{p1,n} \end{bmatrix} = \begin{bmatrix} \cos\theta_{23} & -\sin\theta_{23} \\ \sin\theta_{23} & \cos\theta_{23} \end{bmatrix} \begin{bmatrix} x_{t1,n} \\ y_{t1,n} \end{bmatrix} \qquad \text{Equation 5}$$

The processor 150 may translate the second line information, which is rotationally transformed based on the coordinate system $(X_3, Y_3)$, to a line based on the coordinate system $(X_3, Y_3)$. In this case, the processor 150 may translate the second line information, which is rotated and transformed based on the coordinate system $(X_3, Y_3)$, to a line based on the coordinate system $(X_3, Y_3)$ through Equation 6 and Equation 7.

$$x_{1,n} = x_{p1,n} + X_R \qquad \text{Equation 6}$$

$$y_{1,n} = y_{p1,n} + Y_R \qquad \text{Equation 7}$$

The processor 150 may generate (extract) the second line information $(x_{1,1}, y_{1,1}), \ldots, (x_{1,n}, y_{1,n}), \ldots,$ and $(x_{1,N}, y_{1,N})$ coordinate-transformed based on the coordinate system $(X_3, Y_3)$.

Figure 7:
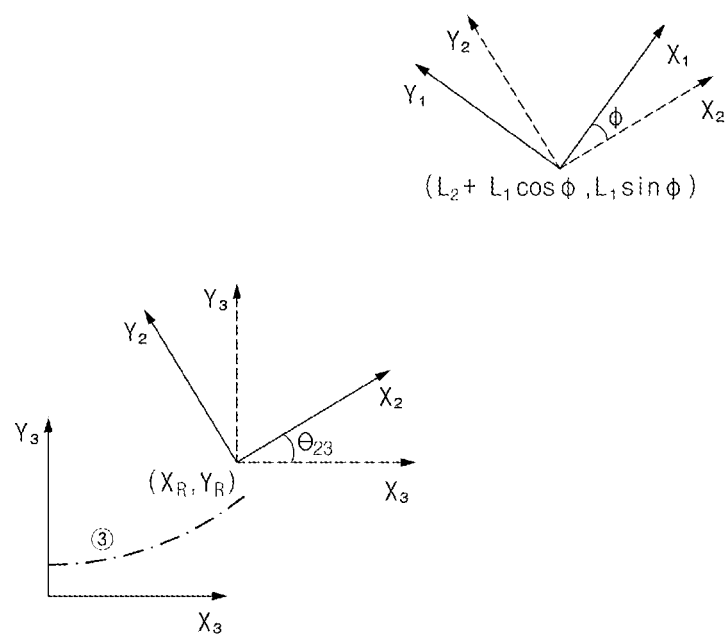
FIG. 7 is a view illustrating coordinate-transformation of information on a first line, in one form of the present disclosure.

FIG. 7 is a view illustrating coordinate-transformation of information on a first line, in some forms of the present disclosure.

The processor 150 may extract information (that is, first line information) on the first line ③ based on the coordinate system $(X_3, Y_3)$ by using the recognizing device 120. The first line information may be expressed as in Equation 8.

$$y_3 = \alpha_{33}x_3^3 + \alpha_{32}x_3^2 + \alpha_{31}x_3 + \alpha_{30} \qquad \text{Equation 8}$$

When the effective line length of the first line is "$l_3$", points $(x_{3,1}, y_{3,1}), \ldots, (x_{3,k}, y_{3,k}), \ldots,$ and $(x_{3,K}, y_{3,K})$ on the effect line may be extracted. In this case, $0 = x_{3,1} \leq \ldots \leq x_{3,k} \leq \ldots \leq x_{3,K} = l_3$ is satisfied.

Figure 8:
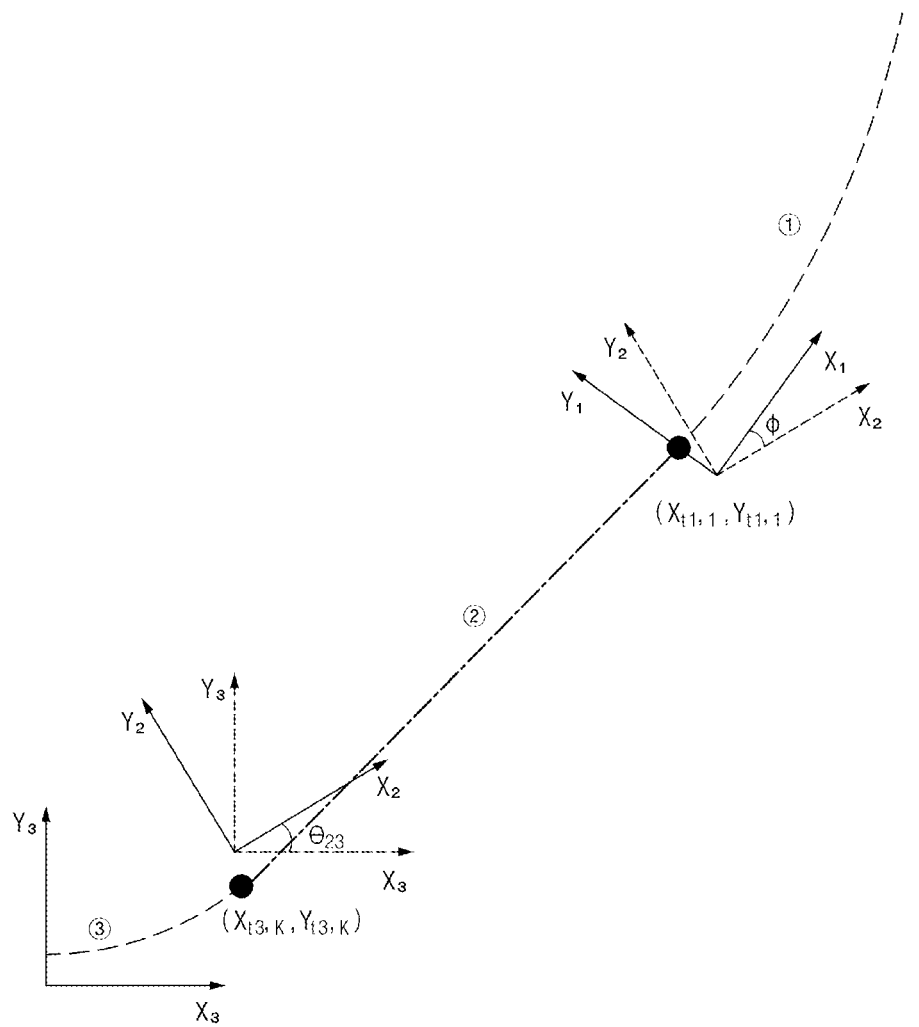
FIG. 8 is a view illustrating coordinate-transformation of information on a third line, in one form of the present disclosure.

FIG. 8 is a view illustrating coordinate-transformation of information on a third line, in some forms of the present disclosure.

The processor 150 may generate information (that is, the third line information) on the third line ② based on the coordinate system $(X_3, Y_3)$ by using the first line information and the second line information. The processor 150 may generate a straight line or a curved line (that is, the third line ②) by setting the starting point of the third line ② to the end point $(x_{3,K}, y_{3,K})$ of the first line ③ and setting the end point of the third line ② to the starting point $(x_{1,1}, y_{1,1})$ of the second line ①. In other words, the third line ② is a straight line (or a curve line) to link the end point $(x_{3,K}, y_3)$ of the first line ③ to the starting point $(x_{1,1}, y_{1,1})$ of the second line ①. The third line ② may be expressed as a polynomial as in Equation 9.

$$y_2 = \frac{y_{1,1} - y_{3,K}}{x_{1,1} - x_{3,K}} (x_2 - x_{3,K}) + y_{3,K} \qquad \text{Equation 9}$$

In this case, the effective line range of the third line is $x_{3,K} \leq x_2 \leq x_{1,1}$. The processor 150 may extract points $(x_{2,1}, y_{2,1}), \ldots, (x_{2,j}, y_{2,j}), \ldots,$ and $(x_{2,J}, y_{2,J})$ on the effective line. In this case, $x_{3,K} = x_{2,1} \leq \ldots \leq x_{2,j} \leq \ldots \leq x_{2,J} = x_{1,1}$ is satisfied.

Figure 9:
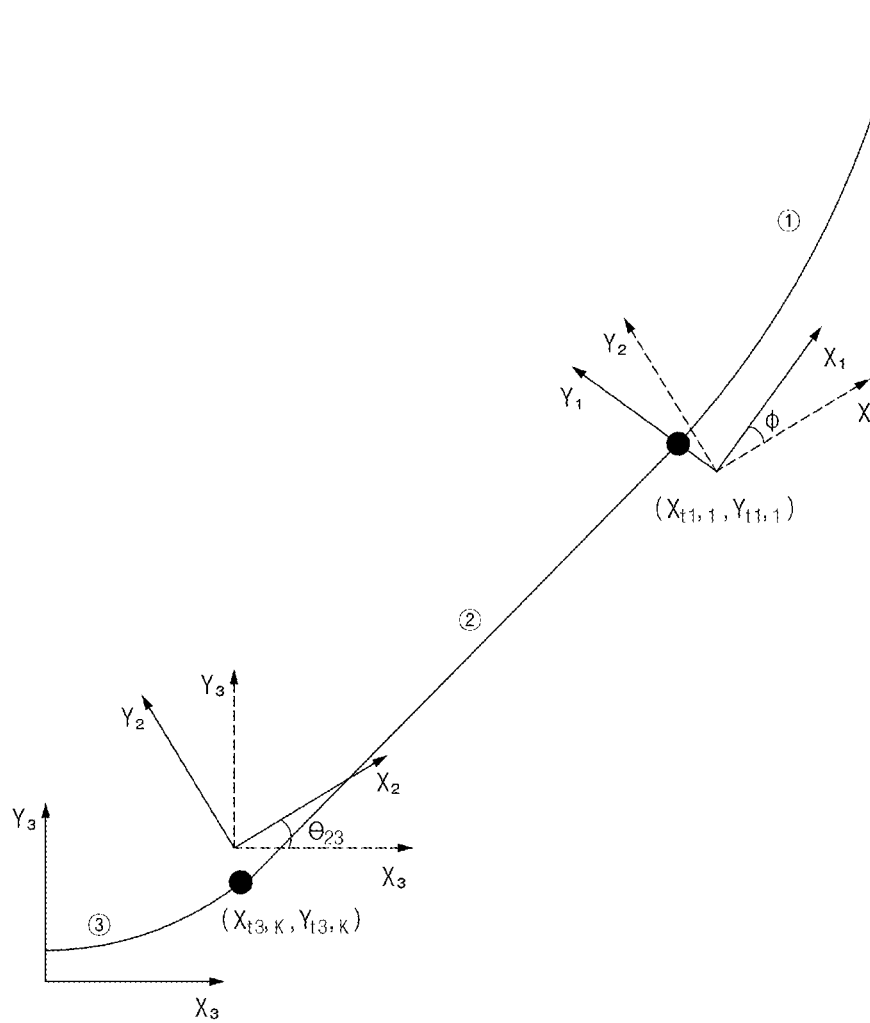
FIG. 9 is a view illustrating coordinate-transformation of information on a final line, in one form of the present disclosure.

FIG. 9 is a view illustrating coordinate-transformation of information on a final line, in some forms of the present disclosure.

The processor 150 may generate final line information ①+②+③ by integrating the first line information, the second line information, and the third line information, based on the coordinate system $(X_3, Y_3)$. The processor 150 may calculate a polynomial that most approximates to points on the first line ③, the second line ① and the third line ② through regression analysis. The final line may be expressed as in Equation 10.

$$y = \alpha_3 x^3 + \alpha_2 x^2 + \alpha_1 x + \alpha_0 \qquad \text{Equation 10}$$

In Equation 10, $\alpha_0$, $\alpha_1$, $\alpha_2$, and $\alpha_3$ denote an offset, a heading angle, a curvature, and a curvature rate, respectively.

The processor 150 may plan the path for platooning through Equation 10. The processor 150 may transmit the planed path for platooning to the vehicle controller 140.

Figure 10:
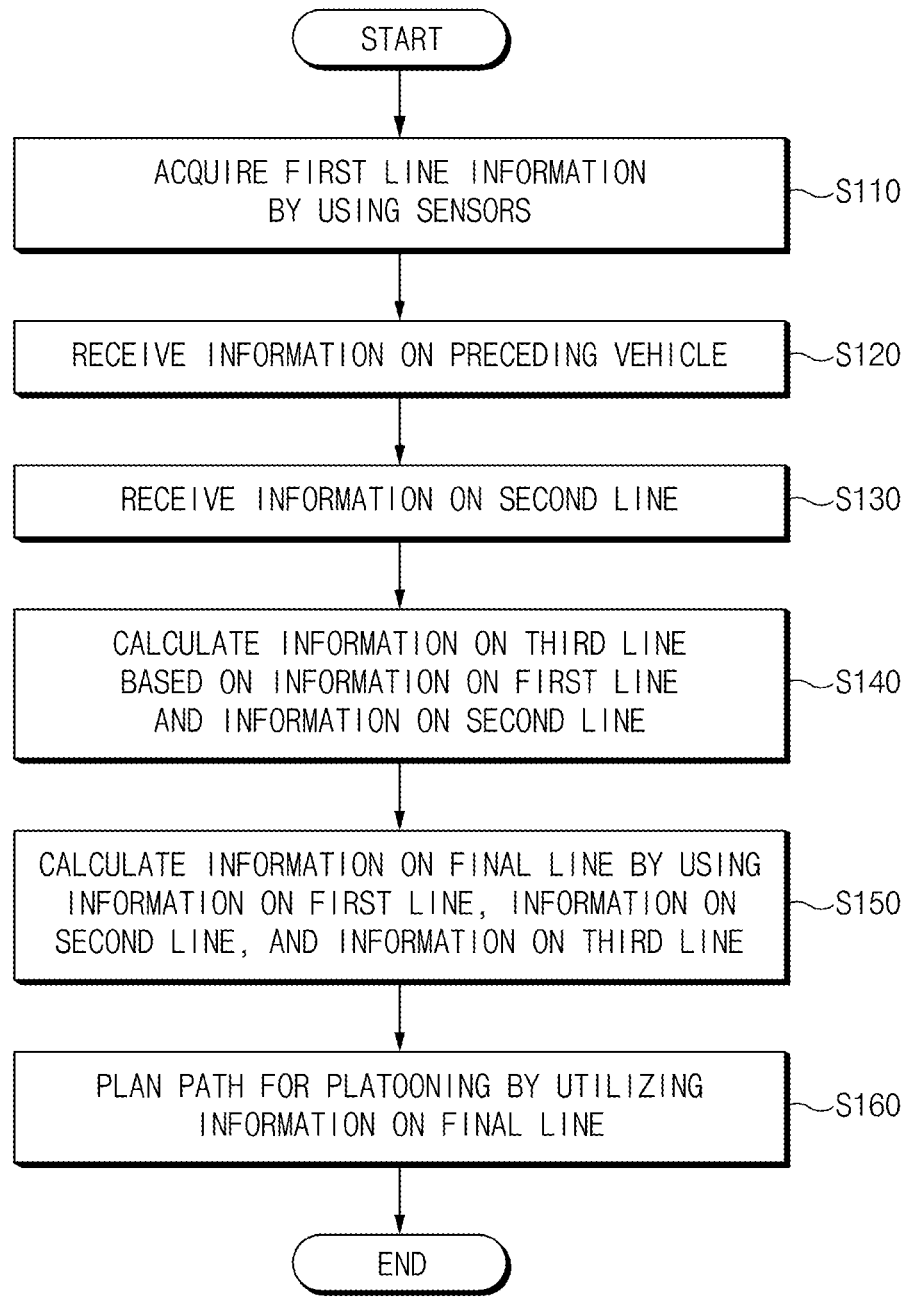
FIG. 10 is a flowchart illustrating a method for planning a path of an apparatus for controlling platooning, in one form of the present disclosure.

FIG. 10 is a flowchart illustrating a method for planning a path of an apparatus for controlling platooning, according to forms of the present disclosure.

The processor 150 may acquire first line information by using at least one sensor mounted in the vehicle (S110). In other words, the recognizing device 120 may recognize a line in front of the vehicle by using the front camera 1211 and/or the AVM camera 1212. The recognizing device 120 may transmit information (that is, the first line information)

on the recognized line to the processor 150. The processor 150 may acquire information on the preceding vehicle through the recognizing device 120. The recognizing device 120 may recognize a position of the center of a rear surface of the preceding vehicle, and the distance between the vehicle and the preceding vehicle, by using the front camera 1211 and the front radar 1213. The recognizing device 120 may transmit, to the processor 150, information on the position of the center of the rear surface of the preceding vehicle, and the distance between the vehicle and the preceding vehicle, as the information on the preceding vehicle.

The processor 150 may receive the information on the preceding vehicle through V2V communication (S120). The processor 150 may receive vehicle specification information and/or information on a status of the vehicle, which is transmitted from the preceding vehicle, through the communication device 110. The vehicle specification information (preceding vehicle specification information) of the preceding vehicle may include the length of the preceding vehicle, a tractor length and/or a trailer length. Information (preceding vehicle status information) on a status of the preceding vehicle may include a refraction angle of the preceding vehicle.

The processor 150 may receive the second line information from the preceding vehicle through V2V communication (S130). The preceding vehicle may recognize the second line by using sensors mounted in a vehicle body and may transmit information on the recognized second line through V2V communication. The processor 150 may receive information on the second line through the communication device 110.

The processor 150 may calculate third line information based on the first line information and the second line information (S140). The processor 150 may coordinate-transform the second line information based on the vehicle coordinate system, based on the information on the preceding vehicle. The processor 150 may generate the third line information by using the first line information and the second line information, which is coordinate-transformed. In other words, the processor 150 may generate the third line by approximating to a straight line or a curved line of passing an end point of the first line and a starting point of the second line.

The processor 150 may generate the information on the final line by using the first line information, the second line information, and the third line information (S150). The processor 150 may generate the information on the final line by using the first line information, the second line information, which is coordinate-transformed, and the third line information.

The processor 150 may plan a path for platooning, based on the final line information (S160). The processor 150 may transmit the planned path for platooning to the vehicle controller 140. The vehicle controller 140 may control the lateral behavior of the vehicle to follow the path for platooning.

Figure 11:
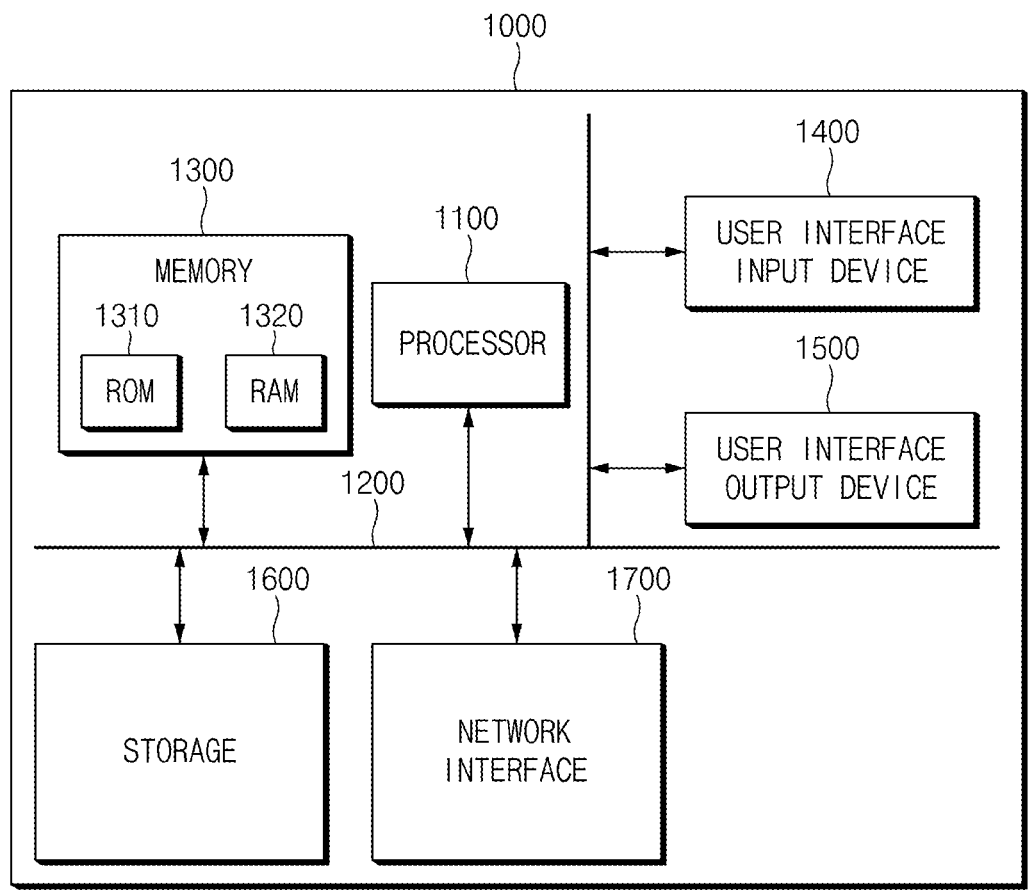
FIG. 11 is a block diagram illustrating a computing system to execute the method for planning a path for platooning, in one form of the present disclosure.

FIG. 11 is a block diagram illustrating a computing system to execute the method for planning a path for platooning, according to forms of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in some forms of the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may reside in an application specific integrated circuit (ASIC). The ASIC may reside in a user terminal. Alternatively, the processor 1100 and the storage medium may reside as separate components of the terminal of the user.

According to the present disclosure, as described above, the information on the line may be estimated by utilizing real-time information of the preceding vehicle in platooning. Accordingly, the information on the line may be provided with higher reliability by reducing the errors accumulated in the rear portion of the string.

In addition, according to the present disclosure, the path for platooning may be planned based on the information on the line, which is estimated by utilizing the real-time information of the preceding vehicle. Accordingly, even if the distance between vehicles is significantly short, the vehicle may be safely traveling while keeping a line.

Hereinabove, although the present disclosure has been described in some forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

What is claimed is:

1. An apparatus for controlling platooning, the apparatus comprising:
   a recognizing device configured to recognize front information of a vehicle by using at least one sensor;
   a communication device configured to support vehicle to vehicle (V2V) communication; and
   a processor connected with the recognizing device and the communication device, wherein the processor is configured to:
   acquire information on a first line in front of the vehicle through the recognizing device,
      wherein the recognizing device recognizes the first line by using a camera mounted in the vehicle;
   receive information on a second line that is transmitted from a preceding vehicle through the communication device, wherein the preceding vehicle acquires the second line in front of the preceding vehicle by using a sensor mounted in the preceding vehicle;
coordinate-transform the information on the second line, based on a vehicle coordinate system, by using information on the preceding vehicle;
generate information on a third line which is hidden by the preceding vehicle by using the information on the first line and the information on the coordinate-transformed second line;
generate information on a final line by using the information on the first line, the information on the second line, and the information on the third line; and
plan a path for the platooning by utilizing the information on the final line.

2. The apparatus of claim 1, wherein the information on the preceding vehicle includes:
a distance between the vehicle and the preceding vehicle, a position of the center of a rear surface of the preceding vehicle, an angle of the rear surface of the preceding vehicle acquired through the recognizing device, a tractor length, a trailer length, and a refraction angle between a tractor and a trailer that is transmitted from the preceding vehicle.

3. The apparatus of claim 1, wherein the processor is configured to:
generate the information on the third line by approximating to a straight line or a curved line to link an end point of the information on the first line to a starting point of the information on the second line.

4. The apparatus of claim 1, wherein the processor is configured to:
generate the information on the final line by integrating the information on the first line, the information on the second line, and the information on the third line based on the vehicle coordinate system.

5. The apparatus of claim 1, further comprising:
a vehicle controller configured to control a lateral behavior of the vehicle to follow a line based on the path for the platooning.

6. The apparatus of claim 1, wherein the recognizing device further comprises:
at least one of a front camera, an around view monitoring (AVM) camera, a front radar, or a refraction angle sensor.

7. The apparatus of claim 1, wherein the processor is configured to:
transmit, to a following vehicle, the information on the first line, a refraction angle of the vehicle, and specification information of the vehicle through the communication device.

8. A method for planning a path of an apparatus for controlling platooning comprising:
acquiring information on a first line in front of a vehicle by at least one sensor mounted in the vehicle, wherein the at least one sensor includes a camera mounted in the vehicle to recognize the first line by the camera;
receiving information on a second line transmitted from a preceding vehicle through vehicle to vehicle (V2V) communication, wherein the preceding vehicle acquires the second line in front of the preceding vehicle by using a sensor mounted in the preceding vehicle;
coordinate-transforming the information on the second line, based on a vehicle coordinate system, by using information on the preceding vehicle;
generating information on a third line which is hidden by the preceding vehicle by using the information on the first line and the information on the coordinate-transformed second line;
generating information on a final line by using the information on the first line, the information on the second line, and the information on the third line; and
planning a path for the platooning by utilizing the information on the final line.

9. The method of claim 8, wherein the acquiring of the information on the first line includes:
acquiring, by using the at least one sensor, the information on the preceding vehicle that includes a distance between the vehicle and the preceding vehicle, a position of the center of a rear surface of the preceding vehicle, and an angle of the rear surface of the preceding vehicle.

10. The method of claim 8, wherein the receiving of the information on the second line includes:
receiving, from the preceding vehicle, a tractor length, a trailer length, and a refraction angle between a tractor and a trailer.

11. The method of claim 8, wherein the generating of the information on the third line includes:
generating the information on the third line by approximating to a straight line or a curved line to link an end point of the information on the first line to a starting point of the information on the second line.

12. The method of claim 11, wherein the generating of the information on the final line includes:
generating the information on the final line by integrating the information on the first line, the information on the second line, and the information on the third line based on the vehicle coordinate system.

13. The method of claim 8, further comprising:
laterally controlling, by a vehicle controller, the vehicle to follow a line based on the path for the platooning.

14. The method of claim 8, further comprising:
transmitting, to a following vehicle, the information on the first line, a refraction angle of the vehicle, and specification information of the vehicle through the V2V communication.

* * * * *